Patented Apr. 7, 1942

2,278,833

UNITED STATES PATENT OFFICE 2,278,833

RUBBERLIKE COMPOSITION CONTAINING NEOPRENE AND POLYVINYL CHLORIDE

Richard A. Crawford, Akron, Ohio, assignor to The B. F. Goodrich Company, New York, N. Y., a corporation of New York No Drawing. Application September 14, 1938, Serial No. 229,938

5 Claims. (Cl. 260—42)

A material which is resilient like rubber is required for a great many types of articles, yet rubber itself is often not suitable because of its sensitiveness to oil, its comparatively rapid deterioration or other inherent weakness. A number of synthetic materials having rubber-like properties have recently become available and overcome certain of the disadvantages of rubber. One of these new materials is the rubber-like polymer of chloro-2 butadiene-1,3 known as Neoprene; but this material, while far more resistant to oil than rubber, still swells slowly when brought in contact with oil. Another of the new materials is the plasticized gamma polymer of vinyl chloride; but, while the polymer itself is absolutely unaffected by fatty oils or petroleum, long-continued contact with these materials slowly leaches out the plasticizers, causing a slow shrinking and hardening of the composition.

I have discovered that Neoprene can be incorporated with plasticized polymerized vinyl chloride in proportions as to balance the changes which take place on contact with oils. Such compositions are apparently homogeneous after the Neoprene has been vulcanized, and even after prolonged contact with oils undergo no appreciable change in volume, strength or resiliency.

The commingling of the Neoprene with polymerized vinyl chloride is greatly facilitated by the fact that the usual plasticizers for polymerized vinyl chloride are likewise compatible with Neoprene. The mixture is usually effected by preparing a preliminary mixture of the crude Neoprene with suitable vulcanizing ingredients, mixing the polymerized vinyl chloride on a hot mill or in a heated mixer with the plasticizer, and then adding to the plasticized polymerized vinyl chloride while continuing the mixing operation, the desired proportion of the Neoprene mixture. It is preferred to reduce the temperature of the mill during the incorporation of the Neoprene, to avoid prevulcanization of the Neoprene. Other mixing techniques may be employed if desired, although that described above gives very good results. The composition is finally shaped by calendering, extruding, molding or the like, and vulcanized.

As a specific example of one embodiment of the invention, 100 parts by weight of Neoprene are mixed with 20 parts of litharge, 5 parts of rosin, 3 parts of magnesia, 2 parts of phenyl-beta-naphthylamine, and 2 parts of maleic acid to form a vulcanizable Neoprene mixture. 100 parts by weight of the gamma polymer of vinyl chloride in powdered form are mixed with 3½ parts of powdered lead silicate and 75 parts of tricresyl phosphate, and the resulting pasty suspension is transferred to a hot roll mill, whereupon it promptly changes to a tough homogeneous mass, and 36 parts of the Neoprene mixture are added and thoroughly mixed at as low a temperature as is convenient. This composition, after heating for 20 minutes at 320° F. in a mold is a strong, resilient, rubber-like product which is unusually resistant to change when subjected to deteriorating influences.

Another similar composition contains 300 parts by weight of the gamma polymer of vinyl chloride, 100 parts of tricresyl phosphate, mixed with 100 parts of Neoprene, 10 parts of magnesia, 2 parts of phenyl-beta-naphthylamine, 5 parts of rosin and 5 parts of zinc oxide, the composition being vulcanized for 45 minutes at 287° F. To demonstrate its extraordinary resistance to change in properties in the presence of oils, this composition after immersion for two weeks in kerosene loses only about 4% in weight and increases about 2% in volume; while a polymerized vinyl chloride composition plasticized with tricresyl phosphate but without Neoprene loses over 20% in both weight and volume and becomes quite hard.

The specific ingredients and proportions are subject to wide variations. The plasticizer may be any compound or mixture of compounds capable of plasticizing the gamma polymer of vinyl chloride, of which a considerable number are now known, such as dibutyl phthalate, benzyl benzoate, amyl naphthalene, ditolyl ether, and the like. The proportion of plasticizer may vary from 10% or less to 200% or more of the weight of the polymerized vinyl chloride, but somewhere in the neighborhood of 50% usually gives the best combination of strength and resilience. The proportion of Neoprene may likewise vary from a small fraction to a multiple of the weight of the polymerized vinyl chloride, although the best results so far have been obtained with proportions approximately equal to those of the plasticizer. It is not essential that the Neoprene be vulcanized, but vulcanization greatly enhances the strength, durability and attractiveness of the product. In addition to the ingredients referred to above, the compositions may contain any of the pigments or fillers commonly used in the rubber and plastics industries.

I claim:

1. A composition comprising the gamma polymer of vinyl chloride, mixed with at least 10% of its weight of a plasticizer therefor, and vulcanized Neoprene homogeneously distributed throughout the composition.

2. A composition comprising the gamma polymer of vinyl chloride, a plasticizer therefor in a proportion approximately half the weight of the polymer, and vulcanized Neoprene in a proportion approximating the weight of the plasticizer, homogeneously distributed throughout the composition.

3. The method of making a composition which is not appreciably altered by contact with oil, which comprises mixing a polymer of vinyl chloride with at least 10% of its weight of a plasticizer therefor and with Neoprene.

4. The method of making a composition which is not appreciably altered by contact with oil, which comprises mixing a gamma polymer of vinyl chloride with at least 10% of its weight of a plasticizer therefor and with Neoprene and vulcanizing the Neoprene.

5. The method of making a composition which is not appreciably altered by contact with oil, which comprises mixing a plasticized gamma polymer of vinyl chloride containing about half as much plasticizer as polymer with a quantity of Neoprene approximating the weight of the plasticizer, and vulcanizing the Neoprene.

RICHARD A. CRAWFORD.